Patented Dec. 3, 1940

2,223,500

UNITED STATES PATENT OFFICE 2,223,500

OXIDATION OF CYCLIC OLEFINS

Norman D. Scott, Sanborn, and Joseph Frederic Walker, Niagara Falls, N. Y., assignors to E. I. du Pont de Nemours & Company, Wilmington, Del., a corporation of Delaware No Drawing. Application February 24, 1937, Serial No. 127,526. Renewed July 26, 1940

17 Claims. (Cl. 260—586)

The present invention relates to the autoxidation of cyclic olefins and more particularly to the autoxidation of cyclohexene and its homologues to produce cyclohexenone and homologues of cyclohexenone, respectively.

The autoxidation of cyclohexene has heretofore been accomplished in the presence of finely divided osmium. The main products of this reaction are reported to be cyclohexenol and cyclopentene aldehyde together with smaller amounts of adipic acid and cyclic adipoin. So far as we are aware, no successful method has heretofore been developed for the autoxidation of cyclohexene to produce cyclohexenone as the main reaction product.

One object of the present invention is to provide an improved method of preparing cyclohexenone and its homologues. Another object is to provide a method for autoxidizing cyclohexene and its homologues to produce in good yields the corresponding cyclohexenones. A further object is the provision of a method of preparing cyclohexenones wherein the autoxidation of the corresponding cyclohexene is effected in the presence of a catalyst which promotes the desired oxidation reaction and under conditions which insure against the formation of hazardous concentrations of organic peroxides in the reaction mixture. Other objects will be apparent from the ensuing description of our invention.

The above objects are accomplished in accordance with our invention by effecting the oxidation of cyclohexene, or a homologue of cyclohexene, with oxygen in the presence of a cobalt, manganese or lead salt which is soluble in the reaction mixture. The oxidation is preferably carried out at a temperature sufficiently high to prevent the formation of hazardous concentrations of organic peroxides.

We have found that yields of 80% and better of cyclohexenone may be readily obtained by the above method. Correspondingly good yields of homologues of cyclohexenone may be obtained by the same method, employing as starting material a suitable homologue of cyclohexene.

The preferred catalyst for practicing our invention is a soluble cobalt salt, i. e. a cobalt salt that is soluble in the reaction mixture that is being oxidized. Any of the so-called "oil-soluble" cobalt "driers" which are used in conjunction with drying oils are effective. Particularly effective are the cobalt salts of: naphthenic acid, acids of drying oils, butyl phthalic acid, resin acids, and acids having the general formula R—O—CH$_2$COOH in which R represents a branched alkyl group having eight or more carbon atoms. By "acids of drying oils" is meant those acids or mixtures of acids which are obtainable from the well-known drying oils of which linseed oil, soybean oil and tung oil are examples. Such acids include, among others, linoleic acid, linolenic acid and the like. The corresponding manganese or lead salts of the above acids may likewise be used in accordance with our invention, but they are generally somewhat less effective than are the cobalt salts.

By the term "soluble salt" is meant a salt which is at least appreciably soluble in the reaction medium, i. e., sufficiently soluble therein to provide an effective concentration of the salt in solution to act as oxidation catalyst. Such effective concentrations usually may be obtained by adding from 0.1 to 5 grams of the salt per 100 cc. of the reaction medium. For most purposes quantities within the range of 1 to 2.5 grams per 100 cc. of reaction medium are most effective and constitute our preferred range.

The mechanism whereby cyclohexenone is produced in our process is not thoroughly understood. There are indications that cyclohexene peroxides are formed as intermediate products during the course of the oxidation since various concentrations of organic peroxides appear to exist in the reaction medium. The concentration of peroxides depends upon the conditions under which the reaction is carried out. The above soluble salts cause the selective formation of the cyclohexenone at the expense of other possible oxidation products, such as cyclopentene aldehyde and cyclohexenol, which are stated to be the main products when finely divided osmium is used as catalyst. The soluble salts cause a more rapid absorption of oxygen and appear to serve a second function in that they promote, especially at optimum temperatures, the decomposition of the peroxide to produce cyclohexenone. But regardless of the manner in which the above mentioned salts function in our process, we have found that these salts may be used as catalysts for the preparation of cyclohexenone and its homologues with excellent results.

The reaction temperature has an important effect upon the reaction under consideration. The reaction may be carried out at room temperature or lower, if desired, however, at such temperatures, hazardous concentrations of organic peroxides are generally formed. An effective and reasonably safe temperature for practicing our invention lies within the temperature range, 40 to 65° C. At temperatures within this range, oxygen absorption occurs at an effective and practical rate, and good yields of cyclohexenone may be obtained. In order to insure against the formation of hazardous concentrations of peroxide, we prefer to carry out the reaction at temperatures of 60 to 65° C. At such temperatures, the concentrations of peroxides remain small since the peroxides are apparently decomposed as rapidly as they are formed.

While air may be used as a source of oxygen, we have found that the use of air is inadvisable for commercial operation. With air, oxygen absorption is slow and therefore, cyclohexenone is formed at a correspondingly slow rate. We prefer to employ as the oxidizing agent in our process substantially pure oxygen, or air whose oxygen content has been enriched so that it contains oxygen in excess of 40% by volume.

The reaction medium preferably consists of substantially pure cyclohexene, or a homologue thereof containing from 1 to 2.5 grams of a soluble cobalt, manganese or lead salt per 100 cc. However, the medium may contain, in addition, an inert solvent provided the amount of such solvent present does not dilute the mixture to such a point that absorption of oxygen is decreased to an impracticable rate.

The following examples illustrate one method of practicing our invention in which cyclohexenone is prepared from cyclohexene.

Example 1

A glass column provided with a perforated plate at the bottom through which oxygen could be delivered in a finely divided condition was packed with glass beads and 350 cc. of cyclohexene containing 7 grams of cobalt naphthenate were added. The top of the column was provided with a condenser for condensing and returning to the column cyclohexene which may be vaporized by unabsorbed gases during the oxidation. The column was surrounded by a water-bath maintained at a temperature of 60 to 65° C. Oxygen was passed into the column until a total of 9.4 liters had been absorbed. The average rate of absorption was 162 cc. per minute. The reaction medium was then removed from the absorption column and 57 grams of crude cyclohexenone isolated from the cyclohexene by fractional distillation. The yield of crude cyclohexenone corresponded to 87.3% of the theory based upon the oxygen absorbed.

Example 2

This example was carried out in a manner similar to the method described in Example 1 except that pieces of aluminum were used as packing material in the absorption column. From 300 cc. of cyclohexene containing 6 grams of cobalt naphthenate, 36.5 grams of crude cyclohexenone were obtained, corresponding to a substantially quantitative yield based upon oxygen absorbed. The average rate of oxygen absorption was 155 cc. per minute and the amount absorbed was 10.2 liters. In this experiment, a small amount of acetic acid added to the reaction medium was effective in preventing the formation of a tarry coating on the aluminum and glass surfaces.

The unreacted cyclohexene, which can be separated from the reaction mixture by distillation, may be employed as starting material in a subsequent preparation.

Homologues of cyclohexene may be effectively oxidized in the same manner to produce the corresponding cyclohexenones. The following example illustrates the preparation of methyl cyclohexenone from methyl cyclohexene.

Example 3

A 200 cc. portion of 3-methyl cyclohexene was oxidized in the manner described in Example 1 above. The rate of oxygen absorption varied between 160 and 197 cc. per minute and a total of 9.2 liters of oxygen was absorbed. The reaction was stopped and the reaction mixture fractionally distilled to obtain a good yield of methyl cyclohexenone.

It is generally advisable to dilute the unabsorbed gases from the reactor, which gases invariably contain some cyclohexene vapors, with an inert gas e. g. nitrogen, or with large quantities of air so that explosive gas mixtures are not discharged.

Our invention may be practiced to obtain yields of cyclohexenone which are 80% or better based upon the amount of oxygen absorbed and which are 70% or better based upon the cyclohexene used up. It is thus evident that our process constitutes a practical yet simple method for producing cyclohexenone or homologues of cyclohexenone from the corresponding cyclic olefin.

Apparatus other than that of the absorption tower type may be employed if desired in practicing our invention. For example, we have obtained excellent yields of cyclohexenone by mechanically shaking a vessel containing the reaction medium in an oxygen atmosphere, the vessel being surrounded by a water bath maintained at a suitable temperature. All that is apparently necessary is that the reaction medium contain suitable quantities of a soluble cobalt, manganese of lead salt and that it be brought into intimate contact, preferably at 60 to 65° C., with oxygen or with oxygen enriched air or a similar gas mixture. Various modifications of the process herein illustrated which are within the scope of our invention will be readily apparent to those skilled in the art of effecting chemical reactions.

The term "soluble salt" is used in the appended claims to designate a salt of cobalt, manganese or lead which is sufficiently soluble in the reaction medium to provide effective concentrations of the salt in solution. The term "homologues of cyclohexene" is used to designate alkyl substitution derivatives of cyclohexene, including the mono- and polyalkyl derivatives, e. g. methyl cyclohexene, ethyl cyclohexene, dimethyl cyclohexene and the like.

We claim:

1. The process comprising oxidizing a compound selected from the group consisting of cyclohexene and homologues of cyclohexene by contacting a reaction medium consisting at least preponderantly of said compound with oxygen in the presence of a salt of a metal of the group consisting of cobalt, manganese and lead, said salt being soluble in said reaction medium.

2. The process comprising oxidizing a compound selected from the group consisting of cyclohexene and homologues of cyclohexene by contacting a reaction medium consisting at least preponderantly of said compound with oxygen in the presence of a salt of a metal of the group consisting of cobalt, manganese and lead at a temperature of 40 to 65° C., said salt being soluble in said reaction medium at said temperature.

3. The process comprising oxidizing a compound selected from the group consisting of cyclohexene and homologues of cyclohexene by contacting a reaction medium consisting at least preponderantly of said compound with oxygen in the presence of a salt of a metal of the group consisting of cobalt, manganese and lead at a temperature of 60 to 65° C., said salt being soluble in said reaction medium at said temperature.

4. The process comprising oxidizing a compound selected from the group consisting of cyclohexene and homologues of cyclohexene by contacting a reaction medium comprising said compound with oxygen in the presence of cobalt naphthenate.

5. The process comprising oxidizing a compound selected from the group consisting of cyclohexene and homologues of cyclohexene by contacting a reaction medium comprising said compound with oxygen in the presence of a cobalt salt of an acid of a drying oil.

6. The process comprising oxidizing a compound selected from the group consisting of cyclohexene and homologues of cyclohexene by contacting a reaction medium comprising said compound with oxygen in the presence of a cobalt salt of an acid of the formula R—O—CH$_2$COOH in which R is a branched alkyl group containing at least 8 carbon atoms.

7. The process comprising oxidizing a compound selected from the group consisting of cyclohexene and homologues of cyclohexene by contacting a reaction medium consisting at least preponderantly of said compound with oxygen in the presence of 0.1 to 5 grams of a cobalt salt per 100 cc. of said reaction medium at a temperature of 40 to 65° C., said salt being soluble in said reaction medium at said temperature.

8. The process comprising oxidizing a compound selected from the group consisting of cyclohexene and homologues of cyclohexene by contacting a reaction medium consisting at least preponderantly of said compound with oxygen in the presence of 1 to 2.5 grams of a cobalt salt per 100 cc. of said reaction medium at a temperature of 40 to 65° C., said salt being soluble in said reaction medium at said temperature.

9. The process comprising contacting a reaction medium consisting at least preponderantly of cyclohexene with oxygen in the presence of 0.1 to 5 grams of a salt of a metal selected from the group consisting of cobalt, manganese and lead per 100 cc. of said medium, said salt being soluble in said reaction medium.

10. The process comprising contacting at 40–65° C. a reaction medium consisting at least preponderantly of cyclohexene with oxygen in the presence of 0.1 to 5 grams of a salt of a metal selected from the group consisting of cobalt, manganese and lead per 100 cc. of said medium, said salt being soluble in said reaction medium at said temperature.

11. The process comprising contacting a reaction medium consisting at least preponderantly of cyclohexene with oxygen at 40 to 65° C. in the presence of 1 to 2.5 grams of a salt of a metal selected from the group consisting of cobalt, manganese and lead per 100 cc. of said medium, said salt being soluble in said medium at said temperature.

12. A method of preparing cyclohexone comprising contacting cyclohexene at 60 to 65° C. with oxygen in the presence of 1 to 2.5 grams of cobalt naphthenate per 100 cc. of said cyclohexene and isolating cyclohexenone from the resulting mixture.

13. A method of preparing cyclohexenone comprising contacting cyclohexene at 60 to 65° C. with oxygen in the presence of 1 to 2.5 grams of a cobalt salt of an acid of a drying oil per 100 cc. of said cyclohexene and isolating cyclohexenone from the resulting mixture.

14. A method of preparing cyclohexenone comprising contacting cyclohexene at 60 to 65° C. with oxygen in the presence of a cobalt salt of an acid of the formula R—O—CH$_2$COOH in which R is a branched alkyl group containing at least eight carbon atoms, 1 to 2.5 grams of said salt being present per 100 cc. of cyclohexene, and isolating cyclohexenone from the resulting mixture.

15. A method of preparing methyl cyclohexenone comprising contacting methyl cyclohexene at 60 to 65° C. with oxygen in the presence of 1 to 2.5 grams of a cobalt naphthenate per 100 cc. of said methyl cyclohexene and isolating methyl cyclohexenone from the resulting mixture.

16. A method of preparing methyl cyclohexenone comprising contacting methyl cyclohexene at 60 to 65° C. with oxygen in the presence of 1 to 2.5 grams of a cobalt salt of an acid of a drying oil per 100 cc. of said methyl cyclohexene and isolating methyl cyclohexenone from the resulting mixture.

17. A method of preparing methyl cyclohexenone comprising contacting methyl cyclohexene at 60–65° C. with oxygen in the presence of a cobalt salt of an acid of the formula R—O—CH$_2$COOH in which R is a branched alkyl group containing at least 8 carbon atoms, 1 to 2.5 grams of said salt being present per 100 cc. of said methyl cyclohexene, and isolating methyl cyclohexenone from the resulting mixture.

NORMAN D. SCOTT.
JOSEPH FREDERIC WALKER.